| United States Patent [19] | [11] | 4,348,228 |
|---|---|---|
| Zarur | [45] | Sep. 7, 1982 |

[54] YIELD OF METAL VALUES FROM INCINERATED SLUDGES

[75] Inventor: George L. Zarur, Springfield, Va.

[73] Assignee: World Resources Company, McLean, Va.

[21] Appl. No.: 185,465

[22] Filed: Sep. 9, 1980

[51] Int. Cl.$^3$ ............................................. C22B 15/00
[52] U.S. Cl. .................................. 75/97 R; 75/1 R; 423/1; 423/27; 423/139
[58] Field of Search ................... 75/1, 97, 99, 101 R, 75/128; 423/1, 27, 139; 110/346

[56] References Cited

U.S. PATENT DOCUMENTS

| 52,132 | 1/1866 | Brower et al. | 75/1 R |
|---|---|---|---|
| 103,973 | 7/1917 | Jackson | 423/1 |
| 1,471,751 | 10/1923 | Rankin | 423/1 |
| 4,033,763 | 7/1977 | Markels | 75/97 |
| 4,162,294 | 7/1979 | Witzke et al. | 423/139 X |

FOREIGN PATENT DOCUMENTS 2079890  11/1971  France ................................ 110/346

OTHER PUBLICATIONS

"Recycling of Incinerator Ash", Levente L. Diosady, Ontario Ministry of Environment, Pollution Control Branch, 135 St. Clair Ave., West, Toronto, Ontario, Canada M4V 1P5, 1973, pp. 35, 48, 50, 72, 73, 74, 75, 76, 80 and 81.

*Primary Examiner*—G. O. Peters
*Attorney, Agent, or Firm*—Dowell & Dowell

[57] ABSTRACT

A process for the recovery of selected metal values from silica containing sludges including incineration of the sludge to degrade organic components, followed by acid leaching of the ash, followed by hydrometallurgical recovery of metal values from the remaining solid and liquid residues, wherein prior to incineration of the sludge a quantity of soluble sodium and/or potassium salts are mixed with the sludge, the quantity being in excess by weight of the silica content of the sludge, and then the incineration step is carried out on this mixture so that silicates which form during such incineration are predominantly soluble in water and in the leaching acid, whereby to avoid the occluding of metal values in insoluble glass matrices which would not be attacked by subsequent acid leaching and hydrometallurgical steps.

5 Claims, 1 Drawing Figure

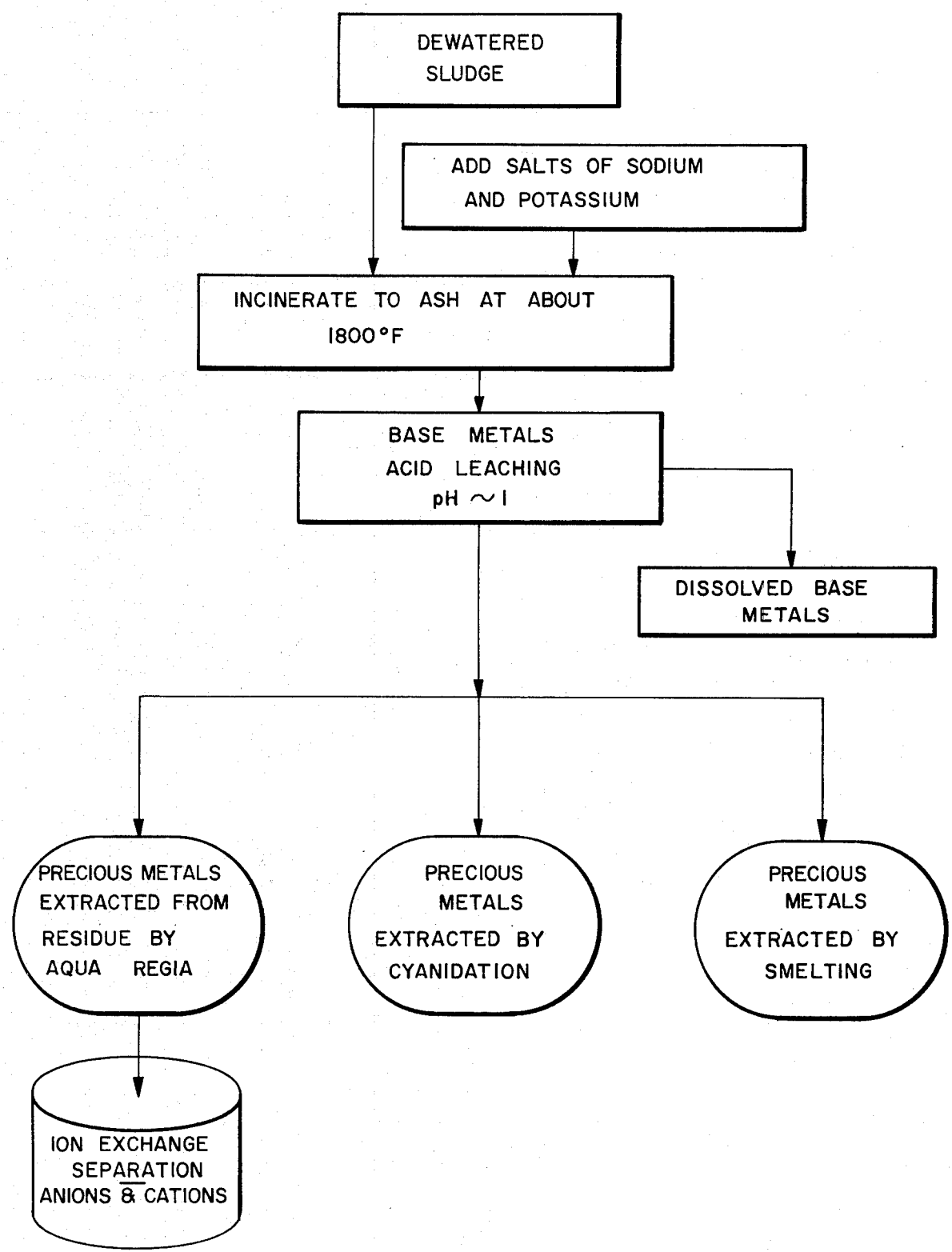

YIELD OF METAL VALUES FROM INCINERATED SLUDGES

BACKGROUND AND PRIOR ART

The accumulation of heavy toxic metals in wastewater sludges has long been recognized as a major problem in sludge disposal. The origin of the mineral values may variously be industrial discharges, urban runoff and sewage, or simply a high natural mineral content in the water itself. Moreover, it is apparent that as a result of the rising dollar costs of metals contained in these wastewaters, the recovery of certain metal values has become economically feasible. Particularly in cases where the sludge has a high content of organic matter, elimination of the organic matter is a major step early in the over-all process of treating the sludge and concentrating the mineral values. A number of different dewatering approaches are used, including physical separation and/or drying of the sludge in sunlight in arid climates. In some cases it is economical to treat the sludge directly with mineral acids to degrade the organic matter, but usually the cost of direct acid treatment becomes prohibitive because of the cost of the quantity of acids required to fully break down the sludge in this manner.

The usual way of degrading the organic matter in the sludge is by incineration, and this treatment is frequently performed on sludges having a high content of silicates. It is to this type of treatment of sludges that the present invention is directed.

Incineration of sludges is generally carried out at high temperatures, of the order of 1800° F. and above, using specially built multiple hearth furnaces which achieve high enough temperatures to rapidly destroy odors and pathogens. However, in the case of sludges having substantial silica content these high temperatures tend to induce reactions between the silica and contained metal salts, which reactions lead to the formation of glass matrices which occlude metal values inside their cellular walls. This is a very serious disadvantage because it renders the occluded metal values virtually inaccessible to conventional hydrometallurgical extraction processes, whereby significant proportions of the total metal values in the sludges do not become separated by acid leaching of incinerated sludge ash. Processes of the type in which metal values become bound in silica glass matrices are typically found in U.S. Pat. No. 4,033,763 to Markels, particularly including processes wherein recovery of metal values from the ash is done by hydrometallurgy and by cyanide extraction.

The deleterious effect of this phenomenon on efforts to recover metal values from sludge ash is not well recognized in the prior art. In U.S. Pat. No. 3,974,783 to Flynn, the inventor discusses the fact that the formation of slag during high temperature sludge incineration is damaging to incinerator parts on which the slag is formed. This patent therefore sets out to reduce the amount of slag formed, and to make that slag which is formed softer and more easily breakable from the incinerator parts. This is accomplished by adding certain metals to the sludge including copper, cobalt, manganese, iron or calcium which lowers the ignition temperature of carbon, and by adding magnesium compounds to the sludge prior to incineration. However, the metals added before incineration in this patent produce silicates which are insoluble in water or in the leach acid and would therefore tend to occlude metal values and thereby reduce the effectiveness of subsequent hydrometallurgical treatment of the ash.

U.S. Pat. No. 4,133,273 to Glennon mixes other waste materials with sludges so that the mixed materials help fuel each other during incineration, but there is no discussion of the effect of slagging due to high temperature incineration.

The metal values present in the sludge can be classified in three different groups as follows:
(1) the noble metals including Ag, Au, Pd and Pt;
(2) the base and transition metals including but not restricted to Al, Fe, Cu, Cr, Sn, Ga, Zn, Mn, Tl, Cd, Co, Mo, etc; and
(3) the ions typically of sulfate, nitrate, and phosphate, which ions are also extracted during the acid leach step, and can be recovered by suitable ion exchange techniques.

Extraction of the metals of these groups can be efficiently achieved by leaching the ash directly with hot acids, such as nitric, hydrochloric and sulfuric, to separate the content into dissolved metal values and residue of the ash which is mainly silica but includes the noble metals also. Final extraction is then achieved by performing such other hydrometallurgical recovery steps as may be necessary to isolate and recover individual metals. However, those metal values which have become occluded inside insoluble glass matrices will generally remain inside the glass matrices and be lost with the residue because they do not respond to subsequently performed acid leach and hydrometallurgical recovery steps. As used in this disclosure, the word "insoluble" should be taken to mean insoluble in water, or in the leaching acids including sulfuric, nitric and hydrochloric. The present invention addresses itself to the steps required to reduce and/or prevent the formation of insoluble glass matrices, whereby substantially all of the metal values can be recovered from the ash without a significant percentage thereof being inaccessible to such further processing. Typical hydrometallurgical recovery steps are outlined in examples presented in this specification, although these steps are not, of themselves, considered novel.

THE INVENTION

For purposes of the present invention, it is assumed that the sludge has been dewatered at least to a moisture content of about 30 to 40 percent, the sludge then being capable of sustaining combustion so that cost-effective incineration can be achieved for oxidizing the organic matter. The sludge is then ground, classified, and subsequently incinerated by means of suitable equipment such as a rotary kiln, a multiple hearth furnace, a fluidized-bed combustor, or other suitable furnace. The incineration step must degrade and oxidize the organic material in the sludge, dispose of the odors, and destroy the pathogens however at the same time avoiding the formation of insoluble slag or glass matrices. This can be done by incineration at regular incinerating temperatures which range from a temperature of about 1400° F. upwardly through 1800° F. after adding to the dewatered and ground sludge sodium and/or potassium compounds in sufficient quantity to provide an excess of these metal cations beyond the proportion thereof required to react with all of the silica in the sludge, whereby the silicates appearing as a complex polymer structure after incineration will be dominated by sodium and potassium silicates, which are soluble both in water and in the leaching acids. The incineration process performed with the above additives to the sludge prior to incineration provides an ash which can be subjected directly to hydrometallurgical extraction processing with the expectation of full recovery of the metal values, since no substantial proportion of the metal values will be occluded in insoluble silica glass and thereby rendered unrecoverable by hydrometallurgical methods. The novelty of this disclosure rests in the silicate chemistry rather than in the conventional hydrometallurgical extraction techniques which are known in the prior art. Such silicate chemistry is also well-known. In general, when silica or other silicates existing in the sludge are heated above the slagging temperature in the presence of various metals, or metallic compounds, including iron, aluminium, calcium, sodium, potassium, magnesium, manganese, zinc, etc, various silicates of these metals are formed which appear as polymer structures having interstices in which metal values sought to be recovered are occluded. Since these silicates are predominantly insoluble in water and in the leaching acids, the metal values become inaccessible to hydrometallurgical recovery. Silicate chemistry is more fully discussed in "Silicate Science"; W. Eitel, editor (several volumes) 1965, Academic Press, N.Y.

OBJECTS AND ADVANTAGES

It is the principle object of this invention to increase the percentage recovery of metal values from an incinerated sludge ash by hydrometallurgical treatment resulting in the substantial elimination of insoluble glass matrix materials, which tend to form in the ash during high temperature interaction between silica in the sludge and various metal salts, the avoidance of formation of such insoluble slags being achieved by adding to the sludge prior to incineration an excess of sodium and/or potassium salts which produce predominantly soluble glass matrices. The yield of metal values during subsequent hydrometallurgical steps is thereby increased because metal values, which would otherwise become occluded inside insoluble matrices, are easily recovered from soluble matrices during the subsequent hydrometallurgical steps. Analysis shows that for sludges containing a high proportion of silica and certain common metals and salts, after high temperature incineration in the absence of the above additives, as much as 60 to 70% of the metal values may be entrapped within the formed glass matrices which are predominantly insoluble, thereby making them hydrometallurgical unrecoverable. Special laboratory treatment of these glass matrices in order to release the occluded values confirms the high proportion of total metal values which become occluded in the glass matrices as a result of high temperature incineration.

Slag is a glass of noncrystalline, amorphous character which, when formed during incineration of a sludge will comprise a number of different metal silicates whose characters and proportions will vary as the types and proportions of metals in the sludge. Typical silicates which are insoluble in water, or in the leaching acids are silicates of calcium, iron, aluminium, zinc, magnesium, manganese, etc. However there are common silicates which are water soluble, or soluble in the leaching acids, and these include silicates of the lighter alkali metals such as sodium and potassium, and to a lesser extent lithium, etc. Slags formed of mixtures of the above soluble and insoluble silicates have varying degrees of solubility in water and leaching acids. If the glass matrix structure has a high proportion of soluble sodium and potassium silicates, then it is easily attacked during subsequent washing and acid leaching steps because the slag comprises a composite polymer structure in which a high proportion of the total silicates will be soluble. As a result, the water or leaching acid can attack the glass matrix so that its polymer bonds are easily weakened, whereby the slag is easily devitrified and the glass matrix breaks apart, releasing occluded metal values.

It might seem that in a sludge the content of sodium and potassium salts would be high so that it would be unnecessary to add such salts, but this is generally not true because the sludge appears as a suspension in water. When the organic matter is separated from the water prior to dewatering for incineration the sodium and potassium compounds, being very soluble, tend to be lost with the clarified water and remain in the sludge only in dilute quantities, whereas on the other hand, the insoluble metal salts tend to remain in the sludge and not be drained away in the clarified water. Therefore the insoluble silicates tend to dominate the slag. This type of glass matrix comprises polyhedra which are predominantly insoluble with interstitial holes which accommodate cations of other metals occluded therein, including the precious metals. By adding an excess of sodium or potassium compounds to the dewatered sludge, a glass matrix which is predominantly water soluble can be formed.

The dewatered sludge is typically about 70 to 80% organic matter and about 20–30% mineral content. If the sludge were analyzed before incineration to determine its silica content, then one could add sodium or potassium compounds sufficient to exceed the stoichiometric requirements, so that the quantity added would be "excess". In the usual case however, no such analysis of the sludge is made, its composition varying widely from time to time. Therefore a more practical rule of thumb is to add about 50% by weight of sodium and/or potassium salts of the expected mineral content of the sludge.

It is another important object of the invention to provide a method of preventing the formation of insoluble glass matrices during incineration by steps which require only the addition of very inexpensive and common chemicals to the sludge in order to achieve the purpose. The best additives are chlorides, carbonates, bicarbonates, oxides, hydroxides, nitrates and sulfates of sodium and potassium, and of these sodium chloride is probably the least expensive and produces the best results from the viewpoint of solubility. Lime is another ingredient of glass which is often present in sufficient quantity in the sludge. If not some lime should be added.

Still another object of the invention is to provide an improved process in which incineration is carried out at a high enough temperature to achieve complete driving off of organic matter, while at the same time destroying all odors and pathogens contained in the sludge.

It is a more general object of this invention to provide an improved incineration technique as a result of which an incinerated sewage ash is produced which emerges from the incinerator in optimum condition for acid leaching, whereby the hydrometallurgical steps required to separate out the various precious and base metal values can be efficiently carried out.

Other objects and advantages of the invention will become apparent during the following discussion of the drawing.

THE DRAWING

The drawing illustrates the steps of a process according to this invention for the incineration of a dewatered sludge followed by the hydrometallurgical recovery of metal values from the resulting ash.

Referring to the drawing, and assuming that the process commences with a wet sludge, it is necessary to dewater the sludge until its moisture content is only about 30 to 40% before the sludge can be autogenously incinerated. The process by which the dewatering is done is not considered novel in the present disclosure, and may be achieved by any one of a number of well-known steps.

Once the sludge is dewatered, the next step is to mix the sludge with a quantity of additive compounds of sodium or potassium. If each batch of sludge had been analyzed to determine its total silica content, it would be possible to determine how much additive to include. However in actual practice no such determination is made, and therefore an estimate is made based on the weight of the sludge after dewatering. Typical sludge is about 70 to 80% organic matter and 20 to 30% minerals, although these estimates vary from day to day even from the same source. As a practical working rule, about one half of the estimated weight of the mineral content is inserted as additives. This figure provides some excess of the sodium and potassium additives, and such an excess is necessary to insure that in each glass matrix structure the silicates formed will be predominantly of the soluble type, i.e. mostly $Na_2SiO_3$ and $K_2SiO_3$. This mixture is then incinerated in a conventional manner. The residence time of dewatered and mixed sludge in an incinerator operating in the 1800° range is typically of the order of 20 to 30 minutes.

The ash which is removed from the incinerator, once the organic matter is completely oxidized, is allowed to cool somewhat, and then is subjected to hot acid leaching step at a temperature of 140° F. or higher using a mineral acid such as sulfuric, nitric or hydrochloric acid, usually sulfuric acid being preferred. The acid is introduced into the ash until the resulting slurry has a pH approaching unity. The exact pH need not be so closely specified but should not exceed 1.5. The residence time in the acid leaching step should be at least 30 minutes in order to achieve substantially complete desolving of the base and intermediate metal values. When such dissolving is substantially complete, the dissolved metal values and remaining acid solution are separated from the solid residue. The residue contains most of the precious metals together with undesirable residual materials such as some insoluble silicates and gypsum. The dissolved solution can then be either discarded if recovery of the base metal values therein is not desired, or can be subjected to such further metallurgical steps as are necessary to recover metal values from the acid solution, these steps generally being well-known in the prior art. The solid residue after washing to remove residual acid and base metal components, can then be further treated by a number of different processes as discussed below to recover the various precious metals contained therein.

One of the ways of recovering the precious metals is to extract them from the residue by introducing hot aqua regia at a temperature of 140° F. or higher which dissolves the precious metals and puts them in solution as ions. The various metals can then be recovered by suitable ion exchange columns, which are specific either for gold or silver, for example. Various suitable resins are commercially available including NSN-280, NBL-17, and AG-50W series. Reference is also made to "Analytical Chemistry", 1975, P.47 by L. L. Sundberg, and "Los Alamos Scientific Laboratory Report" #LA-70-83, 1976.

The solid residue from the base metal leaching step can also be treated for extraction of precious metals by cyanidation steps which are well-known in the prior art. A typical cyanide extraction step is described as Example No. 6 appearing in column 10 of Markels U.S. Pat. No. 4,033,763 mentioned above in this specification.

Another known way of recovering the precious metals from the solid residue of the base metal leaching step is by smelting. In a typical process of this type the solid residue can be mixed with an ore, for example of copper, or zinc or lead, and the ore can then be treated by pyrometallurgical steps including smelting steps as set forth in Examples 2, 3 and 4 of the above Markels patent 4,033,763.

The following examples illustrate the process.

EXAMPLE 1.

Dried sludge was ball milled and mixed with 50% by weight of potassium chloride. The mixture was then incinerated for an hour in an oven at 1500° F. with constant stirring. The resulting ash was then cooled and subjected to a leaching step first using water and then a 5% sulfuric acid solution. This leaching step dissolved 55% of the solids and extracted the iron salts and the excess potassium chloride with high efficiency. A second acid leaching step was then performed using hot sulfuric acid to extract the residual heavy metals, the sulfuric acid comprising about 40% by weight of the residue from the first leaching step. This leaching was carried out at a temperature of about 140° F., and at the end of two hours the solution was allowed to cool and settle, and the remaining sulfuric acid solution was drawn off taking with it dissolved base and intermediate metal values. The solid residue was further washed to remove any residual dissolved values. Analysis showed that better than 90% of the total base metal content had been removed from the ash. Further analysis showed that the residual solids after the sulfuric acid leach comprised mostly silica and gypsum together with the precious metal content. Some silver was extracted by the sulfuric acid leach. The residue from the above leaching step still contained substantial sulfuric acid, and had to be neutralized before cyanidation could be proceeded with. The pH was then adjusted to about 11 by the addition of lime and ammonium hydroxide.

Cyanidation was then carried out as set forth in EXAMPLE No. 6 in the Markels U.S. Pat. No. 4,033,763 using 2% sodium cyanide with a 30% ratio of ash to cyanide solution. The cyanide process extracted about 80 to 85% of the silver, although longer contact time using fresh cyanide solutions and higher ammonia content will somewhat increase the recovery rate. The gold content, however, was unaffected by the addition of ammonia and 90 to 95% extraction efficiencies were readily obtained.

EXAMPLE 2.

This example is similar to Example No. 1 through the sulfuric acid leach step, but instead of cyanidation, the precious metals were recovered by treatment of the leached residue using aqua regia at about 180° F. Concentrated aqua regia was added in the amount of about 40% by weight, and at the end of four hours the solution was withdrawn, containing both residual heavy metals and the precious metals. During extraction of the precious metals acid consumption was minimal due to the low pH level of the solids after the sulfuric acid leach step. A trace of silver residue was left, however. The extraction of precious metals from aqua regia solution was carried out by passing the solution through ion-exchange columns that were respectively specific for gold and for silver using the above-mentioned commercially available resins for this purpose.

EXAMPLE 3.

This example relates to the recovery from the residue of the base metal leaching step to retrieve precious metals extracted by smelting, and the steps in this example are similar to those which are used to recover metals from incinerated ash as discussed in connection with Examples 3 and 4 of the Markels U.S. Pat. No. 4,033,763, owned by the assignee of this disclosure.

EXAMPLE 4.

This example is similar to Example No. 1, except that sodium carbonate was used as the additive to the sludge prior to incineration instead of potassium chloride. The results of the present process paralleled the results obtained in Example No. 1.

Aside from the above examples, tests were run using mixtures of soluble sodium and potassium salts, and these mixtures were found to yield equivalent results.

The present invention is not to be limited to the exact processes discussed in the examples, for obviously changes can be made within the scope of the following claims.

I claim:

1. A process for improving the yield of metal values recovered from dewatered organic sludge by the addition of selected additives to the sludge prior to incineration, wherein the sludge has as a principal ingredient organic matter complexed with certain metal values and has inorganic matter including silica, alumina, lime and other uncombined metal values, and wherein the organic content of the dewatered sludge is then degraded by incineration to produce an ash comprising residual solids including metal values entrained in soluble refractory materials so that the metal values are accessible for recovery by hydrometallurgical extraction, the process comprising:
   (a) mixing additives with the dewatered sludge to form a mixture of the sludge with said additives prior to incineration, said additives being alkali metal salts selected from the soluble salts of sodium and potassium including chlorides, carbonates, bicarbonates, oxides, hydroxides, nitrates and sulfates, and the additives being added in sufficient quantity to provide an excess of alkali metal atoms beyond the proportion thereof required to convert the silica to acid leachable silicates:
   (b) incinerating said mixture of dewatered sludge and additives to drive off the organic matter and produce an ash including said silicates in soluble forms;
   (c) acid leaching the ash to produce liquid and solid components respectively containing different metal values; and
   (d) recovering selected metal values from said components.

2. The process as claimed in claim 1, wherein the proportion by weight of the additives in said mixture is at least equal to the weight of the silica contained in the sludge.

3. The process as claimed in claim 1, wherein the proportion by weight of the additives in said mixture is at least 50% of the weight of the dried mineral content of the sludge.

4. The process as claimed in claim 1, wherein said leaching is carried out using an acid selected from the group including sulfuric, nitric and hydrochloric acid.

5. The process as claimed in claim 1, wherein said recovered metal values are selected from a group of noble metals including Ag, Au, Pd and Pt, and from a group of base and transition metals including Al, Fe, Cu, Cr, Sn, Ga, Zn, Mn, Tl, Cd, Co, Mo, and Ni.

* * * * *